(12) United States Patent
Ashenbrenner et al.

(10) Patent No.: US 9,429,992 B1
(45) Date of Patent: Aug. 30, 2016

(54) WIRED AND WIRELESS DOCKING STATION

(75) Inventors: Robert Ashenbrenner, Austin, TX (US); Phillip Bagwell, Georgetown, TX (US)

(73) Assignee: Motion Computing, Inc., Austin, TX (US)

( * ) Notice: Subject to any disclaimer, the term of this patent is extended or adjusted under 35 U.S.C. 154(b) by 1523 days.

(21) Appl. No.: 11/868,654

(22) Filed: Oct. 8, 2007

(51) Int. Cl.
*H04B 1/38* (2015.01)
*G06F 1/16* (2006.01)
*G06F 13/40* (2006.01)

(52) U.S. Cl.
CPC ......... *G06F 1/1632* (2013.01); *G06F 13/4081* (2013.01)

(58) Field of Classification Search
USPC .......................................................... 455/557
See application file for complete search history.

(56) References Cited

U.S. PATENT DOCUMENTS

| | | | |
|---|---|---|---|
| 5,930,368 A | 7/1999 | Hocker et al. | |
| 5,964,847 A | 10/1999 | Booth, III et al. | |
| 6,081,536 A | 6/2000 | Gorsuch et al. | |
| 6,359,872 B1 | 3/2002 | Mahany et al. | |
| 6,600,734 B1 | 7/2003 | Gernert et al. | |
| 6,678,253 B1 | 1/2004 | Heath, Jr. et al. | |
| 6,778,824 B2 | 8/2004 | Wonak et al. | |
| 6,915,135 B1 | 7/2005 | McKee et al. | |
| 7,076,270 B2 | 7/2006 | Jaggers et al. | |
| 7,089,034 B1 | 8/2006 | Schornack et al. | |
| 7,110,789 B1 | 9/2006 | Curtiss et al. | |
| 7,165,725 B2 | 1/2007 | Casey | |
| 7,190,954 B2 | 3/2007 | Wonak et al. | |
| 7,231,481 B2 | 6/2007 | Scott et al. | |
| 7,471,651 B2 | 12/2008 | Mahany et al. | |
| 7,787,821 B2 | 8/2010 | Hamaguchi | |
| 2004/0148445 A1* | 7/2004 | Lee et al. ........................ | 710/72 |
| 2005/0246470 A1 | 11/2005 | Brenner | |
| 2006/0026326 A1 | 2/2006 | Hunt et al. | |
| 2006/0133290 A1* | 6/2006 | Lindoff et al. ................ | 370/252 |
| 2006/0172715 A1* | 8/2006 | Carballo et al. ........... | 455/127.2 |
| 2007/0079048 A1 | 4/2007 | Starr et al. | |
| 2008/0195788 A1 | 8/2008 | Tamir et al. | |

OTHER PUBLICATIONS

"How Terminal Services Works," Microsoft Corp., Mar. 28, 2003, 14 pages.
Stokes, "PCI Express: An Overview," Jul. 7, 2004, 20 pages.

(Continued)

*Primary Examiner* — Hsin-Chun Liao
(74) *Attorney, Agent, or Firm* — Egan, Peterman, Enders & Huston LLP (57) ABSTRACT

A portable computer, system, and method for a wired and wireless docking station are provided. The portable computer may function to connect to a docking station via either a wired or wireless channel of communication depending on the signal strength of a wireless communication as determined by a comparator, or depending on whether it has been physically connected to a docking station. The system may also be modular so that it can be acquired by a computer user as separate modules, and may provide support for charging an additional battery through a power connection that is separate from the docking connector. A process is also provided that allows a portable computer user to automatically commence and switch between wired and wireless docking sessions by either placing the computer either within range of the docking station or by connecting it to the docking station with a docking station connector.

18 Claims, 6 Drawing Sheets

(56) References Cited

OTHER PUBLICATIONS

Eyler, "An Overview of ping," Linux Journal, Oct. 10, 2005, 4 pages.
Williams, "LDAP Whitepaper," PROplus Systems, Inc., Mar. 2000, 4 pages.
Wood, "UWB Standards," WiMedia Alliance White Paper, Jun. 1, 2006, 4 pages.
Foerster et al., "Ultra-Wideband Technology for Short- or Medium-Range Wireless Communications," Intel Corporation 2001, 11 pages.
Office Action mailed Jun. 17, 2010 for U.S. Appl. No. 11/868,702.
Office Action mailed Nov. 15, 2010 for U.S. Appl. No. 11/868,702.
Office Action mailed Mar. 2, 2012 for U.S. Appl. No. 11/868,702.
Notice of Allowance mailed Jul. 6, 2012 for U.S. Appl. No. 11/868,702.

* cited by examiner

WIRED AND WIRELESS DOCKING STATION

BACKGROUND OF THE INVENTION

1. Field of the Invention

The present invention relates to personal computers and docking stations, also known as port replicators. More specifically, the present invention relates to a docking station that is able to support both wired and wireless docking. The docking station can be used to connect a portable computer via a wired or wireless channel of communication, thereby coupling the computer with a network and peripheral devices such as a monitor, keyboard, optical drive or mouse. The docking station may also be modular, and an embodiment of the docking station may be used to retrofit existing docking stations that only support wired connections to allow them to also support a wireless connection.

2. Description of the Related Art

The following descriptions and examples are not admitted to be prior art by virtue of their inclusion within this section.

Portable personal computers (PCs), including tablet PCs, laptop computers, and personal digital assistants (PDAs), allow computer users to utilize many of the functions of a personal computer while facilitating freedom of movement about the workplace. Particularly, tablet PCs can offer a very high level of mobility and flexibility to the user. Tablet PCs are often used in the medical profession, where a doctor or nurse can use the tablet PC in place of a pen and paper. The tablet PC allows users to easily update files electronically while also recording data on a single device and moving from point to point. Tablet PCs are also common in manufacturing and warehouse environments, where users benefit from being able to remain mobile and use a single device to electronically record data from many locations for the purposes of keeping track of inventory, performing inspections and managing workloads.

Portable computers are generally lightweight and compact, but may compare unfavorably to desktop computers in some respects because they are equipped with smaller keyboards and displays. Further, some portable computers may not have a keyboard, mouse, printer ability, local area network (LAN) connection, or an optical drive. To overcome these shortcomings, many portable computer users connect their computer to a docking station when they are using their computer in an office environment. The docking station can equip the portable computer with most of the characteristics of a desktop computer. Generally, a docking station has a power source to charge the battery of the computer in addition to numerous ports that provide connectivity to local area networks and peripheral devices such as optical drives, monitors, printers, keyboards, and mice. A user typically initiates a docking session by establishing a physical connection between the docking station and the portable computer, usually by engaging corresponding connectors of the portable computer and docking station. When the physical connection is made between the laptop and the docking station, the docking station provides the portable computer with access to the necessary ports and any connected peripheral devices. Because the docking stations serve as an intermediate connection between a portable computer and a number of ports by replicating the ports found on many computers, docking stations are also referred to as port replicators.

Figure 1:
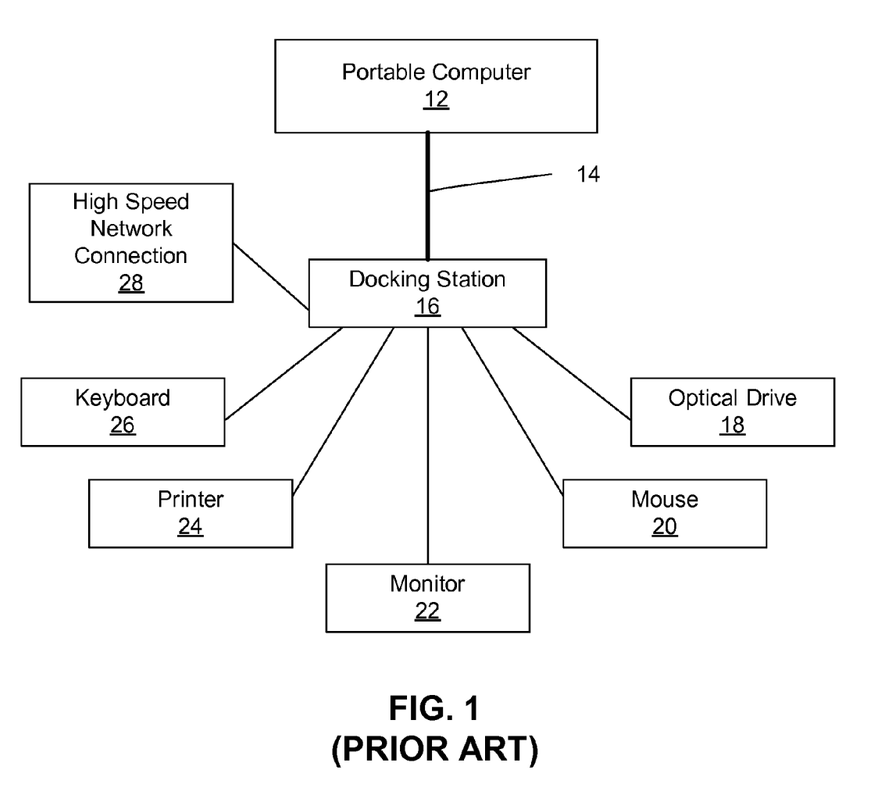
FIG. 1 is a block diagram of a docking station/port replicator that connects a portable computer to several peripheral devices via a wired connection between the docking station and portable computer.

FIG. 1 is a block diagram showing a common docking system configuration. The system includes a portable computer 12 and a docking station 16 connected to an optical drive 18, a mouse 20, a monitor 22, a printer 24, a keyboard 26, a high speed network connection 28, and possibly other input/output devices or peripheral devices. Most portable computers require multiple individual physical (mechanical/electrical) connections to attach a standard set of peripherals such as those shown in FIG. 1. The use of a docking station allows a user to replace the individual connections to each peripheral device with a single connection 14 to the docking station 16.

Most docking station architectures function by extending an internal bus bridge, such as PCI or PCI Express, of the portable computer to the docking station. Other architectures extend discrete buses, such as USB, VGA, and audio, to the docking station where they can connect to each of the peripherals via replicated ports. The replicated ports may include a variety of interfaces, such as USB ports, an IEEE 1284 parallel port, an RS232 serial port, PS/2 style mouse and keyboard connectors, VGA and/or DVI-style display (monitor) connections, an RJ45 Ethernet port, IEEE 1394 (Firewire), modem flash card ports such as Sony's Memorystick, Compact Flash, and others. The typical interface between the docking station and the portable computer uses a specialized, self-aligning high-pincount connector assembly. Because of the complexity and repeated mechanical connection and disconnection of this connector, the connector is expensive and susceptible to fatigue related failure. Another expensive attribute of the physical docking station connector is that the surfaces usually require alignment features to prevent damage to the pins caused by a misaligned connection attempt.

Since the shape of the connector makes it difficult to clean, the connector is also a place for dirt or germs to accumulate on the portable computer. Dirt from contaminant-heavy work environments such as cars, work sites, and warehouses can cause the docking connector to fail, which may require the replacement of the computer. Similarly, germs may contaminate the connector of a computer used in a healthcare oriented workspace, such as a hospital, nursing home, or clinic. If a computer becomes contaminated, it can spread germs or infection when it comes into contact with people or communicates the germs to a docking station, which would in turn contaminate other computers and people. Thus, it is desirable to devise another way to connect a portable computer to a docking station.

Some docking stations attempt to simplify the docking connection by using a USB connection in the place of the high-pincount connector. While the USB interface provides a more simple connection than that of the traditional docking connector, these docking stations suffer a bandwidth constraint because the USB interface does not have enough bandwidth to support the data rates associated with a monitor display signal combined with data transfers necessary to operate the peripheral devices. Thus, any improved docking station should take the need for a high bandwidth connection into consideration.

SUMMARY OF THE INVENTION

Many of the shortcomings of a traditional wired docking station may be overcome by a wireless docking system. In particular, a computer that is able to wirelessly dock to a docking station via a high speed wireless connection may add mobility and flexibility to a workspace. Further, a docking system that is able to support both wired and wireless docking session is of additional value because it gives a computer user the flexibility and mobility of a wireless dock while still allowing for the benefits of wired connections, such as higher bandwidth and the ability to charge a battery.

A portable computer is provided that comprises a wired connector and a wireless transceiver that may operate to transmit a ping signal across a wireless medium and receive an acknowledge signal also across the wireless medium in response to the ping signal. The portable computer also has a comparator coupled to the transceiver. The comparator may be used to measure the strength of the acknowledge signal against a predetermined value. If the wired connector is disconnected and the strength of the acknowledge signal is greater than the predetermined value, the computer may transmit data from the transceiver across the wireless medium in lieu of transmitting data across the wired connector.

Also provided is a computer docking system that comprises a portable computer having a first wireless transceiver and first wired connector and a docking station having a second wireless transceiver and second wired connector. The portable computer and docking station may operate to exchange data across a wired medium between the portable computer and at least one peripheral device via the first and second wired connectors if the first and second wired connectors are frictionally engaged. When the first and second wired connectors are not frictionally engaged, the portable computer and docking station may operate to exchange data across a wireless medium between the portable computer and said at least one peripheral device via the first and second wireless transceivers. The wireless exchange of data may commence when a comparator receives an acknowledge signal responsive to a ping signal across the wireless medium that exceeds a predetermined value.

A method for sending data between a portable computer and a docking station is also provided. The method comprises moving the portable computer toward a docking station, initiating wireless communication between the portable computer and the docking station if an acknowledge signal sent to the portable computer from the docking station exceeds a predetermined value. The method also comprises terminating wireless communication between the portable computer and the docking station if either the signal strength of the transmission sent across the wireless transmission medium drops below the predetermined value, or a pin connector on the portable computer is frictionally engaged with a pin connector on the docking station.

BRIEF DESCRIPTION OF THE DRAWINGS

Further advantages of the present invention may become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Ultrawideband (UWB) is a high bandwidth radio technology that is able to support high data rate applications. The UWB communications protocol offers built-in security in the form of encryption, is optimized for short-distance applications, and is defined to operate in the 3.1 GHz to 10.6 GHz frequency range. UWB is meant to transmit information quickly and it can also be cost effective by virtue of the low amount of power consumed by UWB transmissions. Bandwidth, or the achievable data rate of the transmission, is also drastically improved with UWB as compared to other forms of wireless communication. The increased bandwidth of UWB wireless connections can be capable of data rates in excess of 1 Gbps, which is adequate to allow a portable personal computer (PC) user to connect to peripheral devices without a need for multiple cables and connectors. Thus, a wireless docking station is now possible. A wireless docking station will have a number of advantages over a conventional wired docking station. In addition to bringing a great deal of freedom to a computer user in terms of their mobility and office configuration, the wireless docking station may be much less costly than a wired docking station because the high-pincount connector is no longer needed. Removing this connector will also increase longevity and reliability of the system because the connector represents a possible point of failure.

Further, in work spaces that accumulate dirt or other types of contaminants, removal of the connector will allow for a cleaner and more hygienic computer by foreclosing the connector as a mode of spreading contaminants and infection. By removing the docking connector and possibly other connectors from computers and docking stations, docking systems may be accomplished that are, simply put, more cleanable. Accordingly, it is noted that the docking system provided may be used to fabricate equipment that is more ideal for healthcare and other industries that may be particularly concerned with contamination issues in the maintenance and use of electronic equipment. Removing points of contamination from electronic equipment such as portable computers and docking stations may serve to increase the useful life of the equipment and also allow the equipment to be more effectively cleaned and sanitized.

A wireless docking station will also be easier to use because the process of connecting a computer to the docking station may be as simple as placing the computer within range of the dock, eliminating the need to establish a properly aligned electrical-mechanical connection. Another advantage of a wireless docking station is that the docking station may be placed in more convenient locations than a user's desktop, making it less likely that the PC will crowd the user's workspace. Of further benefit, the UWB transmission protocol provides a powerful layer of security. Thus, a wireless docking station can offer a very useful, flexible, and secure alternative to a wired docking station.

While a purely wireless docking station solves many of the problems outlined above, such a docking station may suffer from other deficiencies by comparison to a traditional docking station. The wireless docking system may have a lower quality display connection, a slower rate of data transfer, or lack an incorporated power supply to charge the battery of a portable computer while it is docked. Thus, it may be desirable to have a docking station that supports dual mode (wired and wireless) usage. This may be advantageous when the user intends to be docked for longer periods and may want to charge the battery of their portable computer, or when a user with a computer that does not support wireless docking shares a dock with other users. Thus, a docking station is provided that enables both wired and wireless docking.

Figure 2:
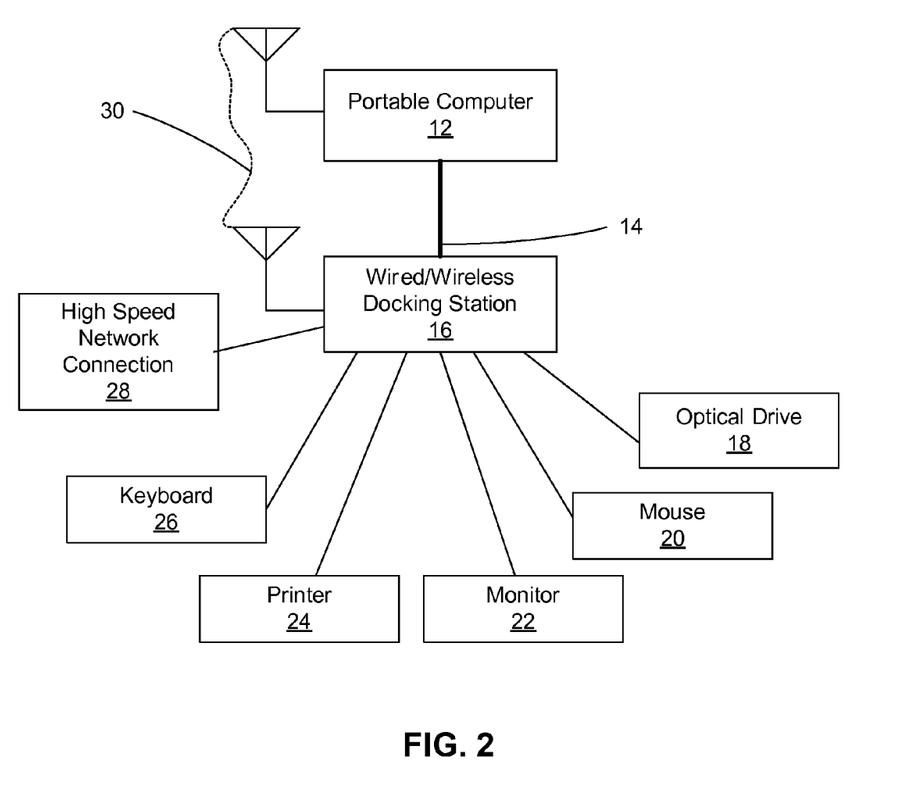
FIG. 2 is a block diagram of a wired and wireless docking station that connects a portable computer to several peripheral devices via either a wireless connection or a wired connection between the docking station and portable computer.

Turning to the drawings, FIG. 2 is a block diagram of a wireless docking system. FIG. 2 shows a portable computer 12 and a docking station 16 that is able to support both a wired connection 14 and a wireless connection 30 with the portable computer 12. The docking station 16 is connected to a keyboard 26, printer 24, monitor 22, mouse 20, optical drive 18, and high speed network connection 28. The traditional mechanical/electrical connection 14 is supplemented by a high data rate wireless (i.e. UWB) connection 30, enabling a computer user to use the devices connected to the docking station 16 without establishing a physical connection 14.

Figure 3:
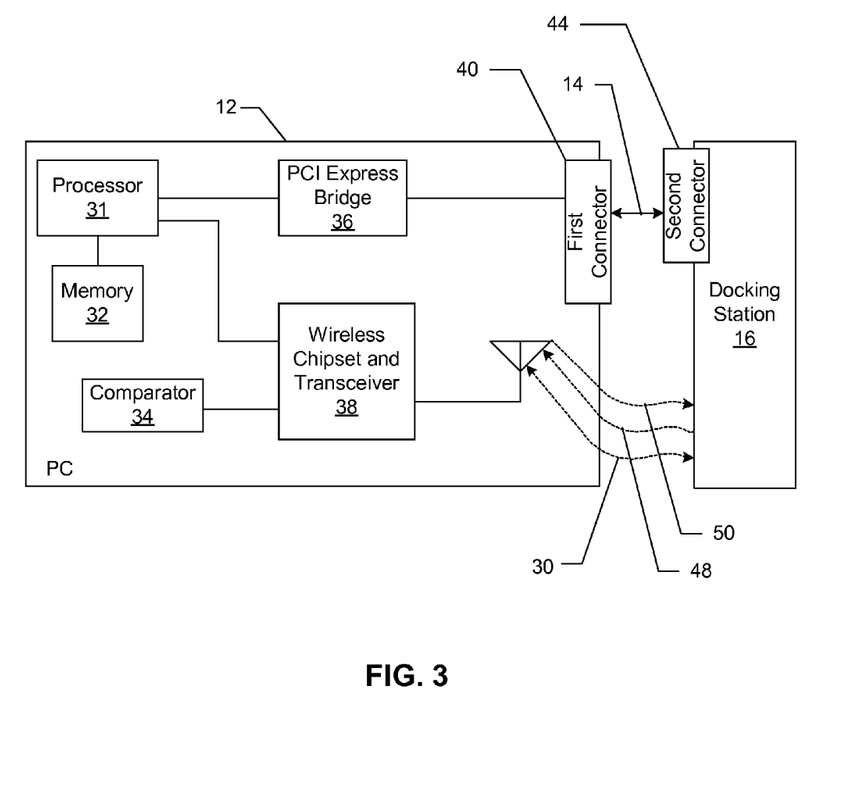
FIG. 3 is a block diagram of at least a part of a personal computer with the traditional docking connector supplemented by a wireless transceiver and antenna.

FIG. 3 is a block diagram of at least a part of a portable computer 12, with both a traditional docking connector 40 and a wireless transceiver 38 and antenna to support a wireless mode of communication such as UWB. The portable computer contains a memory 32 for storing the configuration of the docking system and a processor 31. The processor 31 implements the software used to run the system and controls whether a wired connection 14 or wireless connection 30 connects the computer 12 to a docking station 16. When a wireless connection 14 is selected, the wireless chipset and transceiver 38 of the PC 12 facilitates wireless communications. The wireless transceiver and chipset 38 is coupled to an antenna and comparator 34. The comparator 34, which may be accomplished with hardware or software functions, may compare the strength of a UWB or other type of wireless signal 48 of the docking station 16 against a predetermined signal strength to determine whether the signal is adequate to support a wireless docking session. To this end, there may be three types of wireless communication exchanged between the PC 12 and a docking station 16. First, the PC may emit "pings" 50, transmissions of echo request packets, to determine whether a docking station 16 is in range. The response to the "pings" 50 may be an acknowledge signal 48 from the docking station 16. This signal 48 may be compared against a predetermined threshold by the comparator 34 of the PC. If the signal strength is adequate to support docking, subsequent docking session communications may be exchanged between the PC 12 and the docking station 16 via a wireless channel of communication 30. The functions of sending pings 50 and acknowledge signals 48 may be accomplished by the wireless transceivers of the docking station and portable computer acting as beacons, as described by the ECMA 368-UWB Standard, which is herein incorporated by reference. Similarly, coordination of devices within radio range may be achieved by the exchange of beacon frames, and periodic beacon transmissions may be used to enable device discovery.

It should be noted that in some cases, the roles of emitting pings and emitting corresponding acknowledge signals of the PC 12 and docking station 16 may be reversed in order to conserve the stored battery power of the PC 12. In such a case, the ping signals would be emitted by the docking station 16 and a PC 12 within range may respond with an acknowledge signal. Here, the comparator 34 of the PC 12 may compare the strength of the ping signal against a predetermined signal strength to determine whether the PC 12 and docking station 16 are within range of one another.

A PC 12 may initiate a wireless channel of communication with the docking station 16 when the processor 31 receives a signal from the wireless chipset 38. In such a case, the wireless chipset and transceiver 38 may function as a bridge to connect the PC to discrete VGA, USB, and audio connections of the docking station 16 via a wireless channel of communication 30. In some cases, it may also be desirable to transmit PCI or PCI Express protocol via the wireless connection 30, thereby connecting the PC 12 to the peripheral devices of the docking station 16. At present, transmission of PCI Express protocol requires a large amount of bandwidth as compared to the allowable bandwidth of UWB or other wireless transceivers. Thus, transmission of PCI Express protocol via the wireless medium would require a bridge chip to buffer the wireless transmissions, which may adversely affect performance of the docking system. However, such a bridge chip is possible, and may become more desirable as technologies improve.

When the processor 31 receives a signal from the PCI Express bridge 36, the processor 31 will communicate with the docking station 16 via the wired channel of communication 14 and cease wireless transmissions 30, 48, and 50 with the docking station 16. Here, The PCI Express bridge may be simply a generic bus bridge linking any local bus of the processor 31 with any bus associated with an input/output device of the docking station 16. When the PC 12 is docked by connecting the first connector 40 of the PC 12 to the second connector 44 of the docking station 16, a channel of wired communication 14 is initiated. The first connector 40 of the PC is designed to palpably and frictionally engage the second connector 44 of the docking station 16. As such, the first connector 40 may have female sockets designed to mechanically and electrically connect with male pins of the second connector 44. This connection effectively extends the PCI Express bus bridge 36 of the PC 12 to the docking station 16. Here, PCI Express is a newer type of bus bridge that has been designed to takeover the role in computer architecture that has been traditionally occupied by the PCI bus bridge. Like PCI, PCI Express functions to connect input and output devices to the input/output controller hub, or Southbridge, of the computer. However, PCI Express differs from PCI in that it is able to attain better data rates than PCI by replacing the shared bus model of a PCI system with a shared switch model. The shared bus model of the PCI architecture requires input/output devices to arbitrate for the use of the bus. Conversely, the PCI Express architecture achieves faster data transfer rates by allowing point to point communications between the input/output devices and the switch, which then routes the data to the input/output controller hub.

Another important benefit of utilizing UWB for docking station related communication is that the UWB communications protocol features built-in security in the form of encryption. Encryption is the process of encoding information in such a way that only the person (or computer) with the encryption key, a code that devices may use to encrypt or decrypt a packet of information that is transmitted to or from a device, can decipher the information. Encryption facilitates secure communication between two devices that are each equipped with the same encryption key, thereby preventing an intruder or eavesdropper from intercepting the transmitted data. In this embodiment, the security keys specified in the ECMA-368 UWB Standard, or equivalent encryption keys, may be used. Symmetric keys, keys that are known only to the parties that exchange encrypted communications and used for both encrypting and decrypting communications, may be used. The ECMA-368 Standard specifies a 4-way handshake mechanism to enable two devices to derive pair-wise temporal keys (PTKs) while authenticating their identity to each other, and a means for the solicitation and distribution of group temporal keys (GTKs). Generally, a pair-wise temporal key is used to encrypt and decrypt protected communications exchanged between two devices (a pair), and group temporal keys are used to protect communications that are broadcasted to a group of devices. The keys are temporal because they have a fixed lifetime and are replaced frequently. The standard also specifies that 128-bit symmetric temporal keys are employed based on AES-128 with Counter Mode Encryption and Cipher Block Chaining Message Authentication Code to provide payload encryption and message integrity code (MIC) generation.

AES-128 is an advanced encryption standard specified in Federal Information Processing Standards Publication 198. Counter with Cipher Block Chaining-Message Authentication Code (CCM) is an algorithm that can provide assurance of the confidentiality and authenticity of data. CCM is based on an approved symmetric key block cipher algorithm whose block size is 128 bits, such as the Advanced Encryption Standard (AES) algorithm currently specified in Federal Information Processing Standard (FIPS) Pub. 197 [2]. AES-128 CCM combines AES-128 with CCM to encrypt and authenticate messages. Encryption is done on part or all of the secure transmission, and authentication is provided by a message integrity code that is included in the transmission. Here, message integrity code is an algorithm that is used to protect the integrity and authenticity of a message by allowing the recipient of a message to detect any changes to the content of the communication. The ECMA-368 Standard defines two levels of security: no security and strong security protection. Strong security code includes data encryption, message integrity code, and replay attack protection, which functions to prevent an eavesdropper from being able to record and replay a transmission to decode it over time. Based on the two levels of security, three security modes are defined to control the level of security for devices in their communications: a device may use one of the two security levels or a combination of them in communicating with other devices by selecting the appropriate security mode.

To derive the UWB security keys, the ECMA-368 Standard further specifies a "4-way handshake mechanism," a process that enables two devices to derive pair-wise temporal keys (PTKs) and group temporal keys (GTKs) while authenticating their identity to each other. The handshake process, which is based on a shared master key that is independently provided to the two devices as a building block of the PTKs, is used to establish a secure relationship between two devices. The handshake process begins when an initiator device composes and sends a first message that includes a PTK derivation command to a responder device. In this command, the initiator specifies the master key for use in the handshake and proposes a parameter from which to derive the PTK based on a pseudo-random function. The responding device then verifies the uniqueness of the transmission and proceeds through the four step process to derive the PTK in conjunction with the initiating device. Each step of the handshake involves validity and uniqueness checks to ensure that the key derivation process is secure. Once PTKs have been derived, GTKs may also be exchanged, and the two keys may operate to encrypt and decrypt communications between UWB enabled devices.

Figure 4:
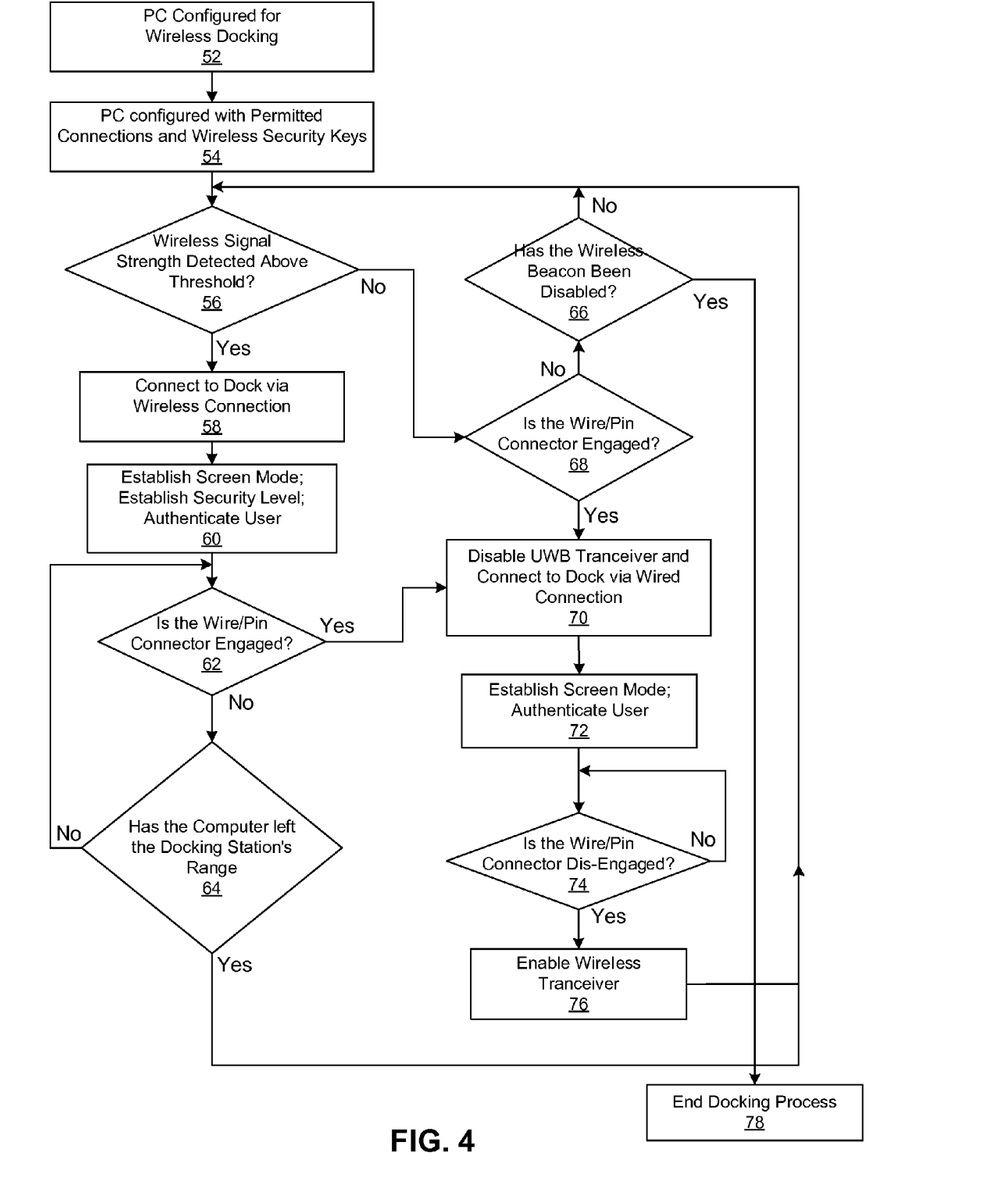
FIG. 4 is a flow chart showing the processes involved in establishing connections between a wired and wireless docking station and a portable computer.

FIG. 4 is a flow chart showing the processes involved in establishing a secured or unsecured (depending on the system configuration) connection between a wired and wireless docking station and a portable computer in an embodiment of the provided docking system. Here, the portable computer is first configured for wireless docking by installing necessary software 52 and wireless security keys 54. Again, the types of security keys specified in the ECMA-368 UWB standard or equivalent encryption keys may be used. Assuming that no connection is yet established, the portable computer periodically determines whether there is a wireless signal from a docking station within docking range of the portable computer 56. If there is no signal within range, the portable computer will monitor to determine whether a wired connection to a dock has been established 68. If there is a wireless signal within range, the portable computer may automatically initiate a wireless docking session with the docking station 58. At the beginning of the docking session, the user may establish their preferred screen mode, such as a mirrored or extended screen mode 60. In other words, the user may choose for a monitor connected to the docking station to function as a substitute display (showing an image that is identical to that shown on the display of the portable computer), or as an extension of the display of the portable computer that increases the display area of the portable computer. When the user establishes a preferred screen mode, the docking protocol will also establish a security level and authenticate the user's identification accordingly 60. While wirelessly docked, the computer and docking station will also monitor to determine whether a wired connection has been established 62. If, at some point during the docking session, the computer is physically connected to the docking station, the wireless session will end and a wired docking session will initiate 70. If the computer is not plugged in to the wired portion of the docking station, then the computer will remain wirelessly docked until it is removed from the range of the wireless docking station 64. The range of the docking station may be selected by the user based on the intended use of the docking session because the attainable data rate of wireless (i.e. UWB) transmissions decreases with distance. Thus, the range may be longer if the purpose of the docking session is to connect to a network resource that can function effectively with a slower data rate such as a printer or optical drive, and the range may be shorter if the purpose of the wireless docking session is to equip the portable computer with a connection to a high data rate resource such as a high-definition display. Whether the docking station is in range may be determined by measuring the signal strength with the comparator, or by using the methods described in the MAC sub-layer specification of the ECMA-368 Standard for making two-way time transfer range measurements between devices.

If the wired connector is engaged 62, then the wireless transceivers of the docking station and computer will be temporarily disabled and a wired docking session will initiate 70. Again, the user may determine their preferred screen mode at the user authentication stage 72. The wired docking session will continue until the computer has been manually disengaged from the docking station 74, at which point the wireless beacon will activate 76 and the computer will re-initiate its search for a wireless docking station 56. For a computer that is not physically docked, it may be necessary or desirable to disable the wireless beacon 66. The disabling of the wireless beacon 66 may be initiated at a user's discretion to conserve power, or initiated automatically if the power level of the battery of the portable computer drops below a pre-selected level. If the UWB beacon has been disabled 66, then the computer will cease searches for wireless docking station, and the docking process will end 78.

Figure 5:
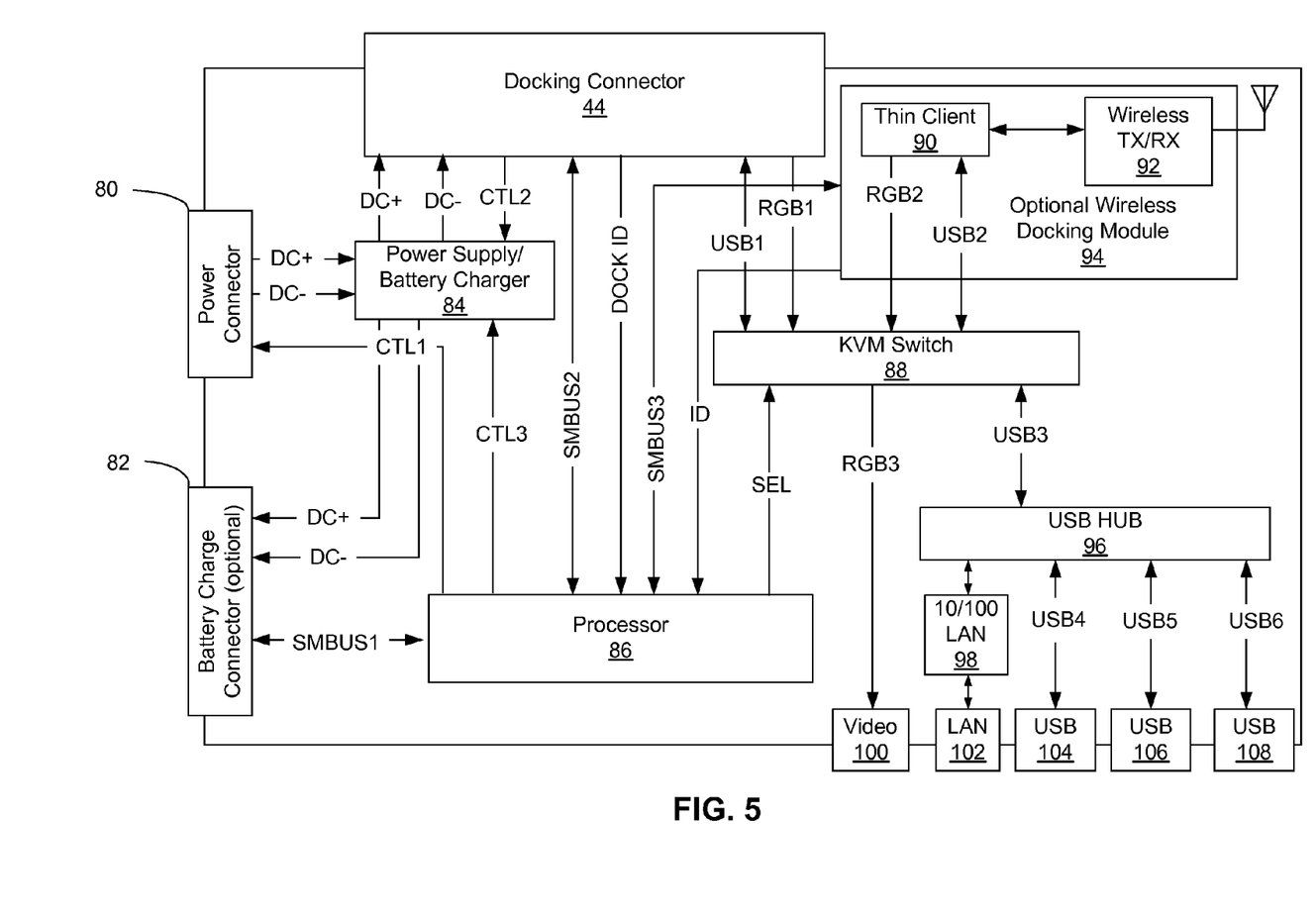
FIG. 5. is a block diagram of at least a part of a docking station architecture for switching between wireless transmissions and wired transmissions to accommodate common dock functions.

FIG. 5 is a block diagram of at least a part of a docking station architecture for converting wireless transmissions to common dock functions in addition to supporting a traditional wired docking station connection. The docking station of FIG. 5 may be viewed as comprising five main components: (1) a docking subsystem with a connector interface that includes power and battery charging functions, (2) a wireless subsystem that supports mobile or wireless connectivity, (3) a switching subsystem that provides automatic switching between wired and wireless operation, (4) an input/output subsystem that provides dock connectivity to external devices, and (5) a thin client subsystem that provides a host for remote desktop protocol (RDP) functionality. The combination of the wireless, switching, and embedded processor subsystems is unique in that it provides a secure high bandwidth radio interface to allow operation of docked peripheral devices when the portable computer is not docked in the traditional sense.

Reviewing FIG. 5 in more detail, the docking subsystem in this embodiment comprises a docking connector 44 to support wired docking. The connector 44 is connected to the KVM switch 88, a hardware or software device that is typically used to connect a single set of peripheral devices, such as a keyboard, display and mouse, to multiple computers. RGB (RGB1) and USB (USB1) connections extend from the connector 44 to the KVM switch 88, and subsequently to the docking station input/output connections. USB1 is communicated through the KVM switch 88 as USB3 to USB hub 96 and subsequently to USB ports 104,106, 108. The inclusion of a USB hub 96 may serve to connect multiple USB connections to the docking station. Relating to the display, RGB signals carry component video signals of a type that is commonly used in computer displays. The RGB signals consist of three discrete signals (red, green, and blue) that together form a complete video signal. RGB1 conveys the video signal from the docking connector 44 to the KVM switch 88 when a computer is physically docked, RGB2 carries the video signal from wireless module 94 to the KVM switch 88 when a computer is wirelessly docked, and RGB3 conveys the video signal to the video port 100 from RGB1 or RGB2 via the KVM switch 88 depending on whether a computer is physically docked or wirelessly docked. The connector 44 is also linked to a power connector 80 through a power supply/battery charger 84 of the docking station. The power supply/batter charger 84 connects to the docking connector 44 so that it may charge a computer during a wired docking session, and to a battery charge connector 82 so that it may also charge an additional battery that is not connected through the docking connector 44. The battery charge connector 82 is linked via SMBUS1 to the processor 86, so that the processor may determine when a second battery is fully charged and display a notify message to a connected portable computer when the battery is fully charged.

The second subsystem of FIG. 5, a wireless subsystem that supports mobile or wireless connectivity, is shown in this embodiment as a component of the wireless docking module 94. Here, a wireless (i.e. UWB) transceiver 92 is used to facilitate docking station communications. A UWB transceiver and chipset 92 may supply the MAC (media access control) and PHY (physical) layers of the UWB communication open systems interconnect (OSI) protocol in accordance with the ECMA-368 UWB Standard or WiMedia UWB platform specifications. The wireless transceiver 92 is connected to the processor 86 via a thin client 90 and the KVM switch 88. The term "thin client" is usually used to refer to a computer or terminal display that depends on another computer or external processor to carry out processing activities. By contrast, a thick or fat client will carry out most of its own processing functions. Here, the wireless module 94 of the docking station functions as a thin client to convey and receive the wireless inputs and outputs between the computer and the peripheral devices connected to the docking station. While the docking station does have architecture sufficient to operate the peripheral devices and convert and transmit signals, it will not undertake the processing functions of the portable computer. In other words, the docking station may operate as a thin client that performs only the processing functions necessary to operate its associated peripheral devices while the portable computer will operate as a server for the docking station by performing the bulk of the required computing functions. The wireless module 94, being a thin client, will convey the RGB2 output and USB2 input/output signal to the wireless transceiver 92 and subsequently to a computer via a UWB transmission for processing. The wireless docking module 94 may also include a wireless media access control (MAC) layer and physical (PHY) layer in accordance with the ECMA-368 UWB Standard or WiMedia UWB platform to support UWB or similar wireless connectivity when operating in a wireless mode. Here, the wireless docking module 94 functions to operate the peripheral devices of the docking station by sending wireless docking communications RGB2 and USB2 to the KVM switch 88 of the docking station.

The third subsystem in this embodiment of the docking station of FIG. 5 is a switching subsystem that provides automatic switching between wired and wireless operation. The switching mechanism comprises a KVM switch 88 (Keyboard, Video, and Mouse switch), a hardware or software device that is typically used to connect a single set of peripheral devices, such as a keyboard, display and mouse, to multiple computers. The KVM switch 88 may be used to switch the input/output signals that are routed through the switch 88 between the wired docking station connector 44 and the wireless docking module 94. The use of the switch 88 restricts the docking station such that the wired and wireless portions of the dock cannot be active at the same time. Here, the KVM switch 88 is controlled by the processor 86 based on a "docked" presence signal from the docking connector 44 that is communicated by a system management bus SMBUS2 or a discrete line communication that sends a DOCK ID signal.

The fourth subsystem in this embodiment of the docking station is an input/output (I/O) subsystem that provides dock connectivity to external devices. Here, I/O controller hub functionality is included to support redirection of the wireless MAC/PHY interface to either the embedded processor 86 or directly to the I/O subsection. The I/O subsection is required to provide interfaces to the external devices. These interfaces may include USB hubs, a USB to LAN function, and a digital to analog converter to convert RGB to VGA, DVI, or a comparable video interface. Also, in place of (or in addition to) the USB ports 104, 106, and 108, the docking station may include legacy port connections, such as R145 Ethernet for a 10/100 LAN connection 102, IEEE 1394, IEEE 1284 and RS-232 ports. In this embodiment, the docking station has three USB ports 104, 106, and 108 to connect a keyboard, mouse, and printer or other miscellaneous USB enabled device(s). In some embodiments, it may be desirable to add USB ports or other ports to achieve connectivity with a particular configuration of peripheral devices. A local area network port 102 may connect to a 10/100 LAN USB to IP converter 98. The 10/100 LAN converter 98 and the USB ports 104, 106, and 108 then connect to a USB hub 96. The USB hub, in addition to a video port 100 will be connected to the KVM switch 88 by the USB3 and RGB3 signals, respectively.

In another embodiment, the processor 86 may function together with KVM switch 88 to ensure that the peripheral devices will operate with a computer that is connected via the docking connector 44, or alternatively with the wireless docking module 94 when a computer is connected wirelessly. Accordingly, if a computer is wirelessly connected to the docking station, the wireless docking module 94 sends an ID signal to the processor 86, which in turn sends a select command (SEL) to the KVM switch 88 that will cause it to connect the computer with the peripheral devices via the wireless module 94. The ID signal may be a single discrete wire used to signal to the processor 86 that the wireless docking module 94 is installed and operating properly. The ID signal may also provide an indication as to whether the wireless docking module 94 is activated. Provided that there is no portable computer connected to the docking connector 44, the processor 86 may activate the KVM switch 88 for the purposes of initiating a wireless docking session upon receiving a signal that the wireless docking module 94 is active.

A fifth subsystem of the docking station comprises the thin client 90, which has a processor with solid state memory that runs a high level lightweight embedded operating system (OS), such as an embedded version of Linux or Microsoft Windows. The processor and operating system of the thin client 90 provide a host for remote desktop protocol (RDP) functionality and must therefore support RDP or similar embedded thin client OS functions. RDP is a multi-channel protocol that allows a user to connect to a computer running a terminal services platform, such as Microsoft Terminal Services. A terminal services platform provides remote access to a computer through thin client software by allowing the client, or docking station, to serve as a terminal emulator. In short, this software enables the computer to interface with the wireless docking module 94 when the computer is wirelessly connected to the docking station by allowing the docking station to function as a terminal of the portable computer. Here, RDP is applied to facilitate the thin client operation of the wireless docking module 94. The portable computer, operating essentially as a server, will transmit computing related communications to the docking station, where the then client of the wireless module 94 will interpret the transmission from the docking station in order to operate the display and other peripheral devices of the docking station.

A single wire serial bus or a dual wire serial bus may be used to convey the ID signal, for instance, a dual wire SMBUS or RS232 serial bus connection may be used. The purpose of the ID signal is to signal to the processor 86 that a wireless docking session is being either activated or deactivated. In addition to indicating whether the wireless docking module 94 is installed and active, a system bus SMBUS3 would also allow for exchange of information between the processor 86 and a thin client 90. This would allow the dock to pass data to the tablet (by transferring through the wireless interface) even when the tablet was not docked. This mode of communication could be utilized to pass information regarding the status of the docking station, the state of charge of any battery attached to the docking station, as well as built-in test capability, which would function to allow the docking station to run a systems check on start-up and send an error message to the portable computer if there is a problem. It would also allow for a more different type of handoff to switch the KVM switch 88 functionality to or from the wireless module and the portable computer when the tablet is first docked or undocked.

Again calling attention to how signals may propagate through the docking station when a computer is wirelessly connected, RGB2 will translate to RGB3 and USB2 will translate to USB3. Alternatively, when a computer is connected via the docking connector 44, the processor 86, which is connected to the docking connector 44 via a system bus SMBUS2, will send the select command SEL to the KVM switch 88. This will cause the KVM switch 88 to support a docking session via a wired connection. Now, USB1 will propagate through the switch 88 to USB3, and RGB1 will propagate through the switch 88 to RGB3 to support the wired docking session. It should be noted that while the drawing contemplates USB and RGB signals, the docking station may support a variety of connection types. Particularly, the video port 100 may be configured to support VGA, DVI, or another display output. While a representative configuration of connectors is shown, it is noted that different connectors may be specified as desired to support the intended connectivity of the docking station.

It is noted that an embodiment of the docking station may have discrete wired and wireless docking modules, such that a consumer may purchase a wired docking station, and then subsequently retrofit or supplement the wired docking station with the wireless module to have a wired and wireless docking station. This could be done by fabricating a pass-through type connector that is routed through the KVM switch 88, so that when the retrofit wireless module is connected to an existing docking station, all of the architecture necessary for a wired and wireless docking station will be assembled.

Referring again to FIG. 3, the wireless docking system may be implemented by connecting an ultrawideband (UWB) or other type of wireless chipset 38 to the computer through an internal system bus, such as PCI Express, mini-PCI, PCI, or PCMCIA to create the PC side of the wireless communication, as shown in FIG. 3. The wireless chipset 38 communicates with the processor 31, memory 32, and/or other peripherals via the PC bridge chipset 36 or an I/O controller hub. The system may also be implemented by any similar approach that will achieve substantially the same basic connectivity.

Similarly, an embodiment of the docking station, as shown in FIG. 5, may include a UWB or other wireless chipset 92. A processor 86 may control bus arbitration and data transfers. The processor 86 of the docking station may also execute any firmware necessary to operate the wireless chipset 92 and other I/O device initialization, data transfers, and controls. Connections to a possible combination of connections to supported peripherals 100-108, such as a monitor via a video port 100, keyboard, mouse, printer or optical drive via USB ports 104, 106, and 108 will connect to the bus or may be integrated into a single common I/O chipset, such as a USB hub 96. Approaches for connecting the peripherals may vary from system to system.

In tandem, the combination of the UWB or other wireless radio transceivers of the portable computer and docking station allow the peripherals connected to the dock to function as if they are directly attached to the portable computer. Bridging functions between the portable computer and the docking station, in addition to arbitration of the data streams and rates of the peripheral devices may be provided by the wireless chipset of the portable computer. Also, because UWB is able to provide a time division (time slot) mechanism, allocation of UWB bandwidth for the peripheral devices connected through the docking station can be scheduled according to need. A mapping function for each peripheral device, connected through the docking station to the operating system of the portable computer, will be provided by the driver of the portable computer in a way that the operating system has connectivity with each peripheral. The mapping function may also facilitate the control and operation of the peripherals as if they were directly attached to the portable computer.

UWB offers a flexible and secure channel of communication may be employed to allow a wireless docking station to be adjustable in terms of its reception range. For example, if users need access to a docking station for the purposes of accessing a restricted optical drive or other resource, the docking station may be configured such that it can be accessed over a longer range. Conversely, when a docking station is meant to be accessible for the purposes of equipping a tablet PC user with a full size monitor, keyboard, and mouse, it may be configured in a way that in can only be accessed by a user within one meter of the docking station. The UWB range may also be determined and preset by a system administrator to correspond to the resources that the docking station makes available. UWB transmission data rates generally correspond to the distance between the UWB devices. The effective range of a UWB docking station may be 2 meters for a resource requiring a bandwidth of 480 Mbps, 4 meters for 200 Mbps, and 10 meters for 110 Mbps. Thus, the useful range of the docking station may be adjustable depending on the resources that are available through the docking station. For instance, a docking station that only serves to provide access to a secure optical drive may function adequately up to 10 meters away, while a docking station that serves the primary purpose of providing access to peripherals and a monitor may require the portable computer to be within one meter of the docking station. Additionally, the pairing protocol may employ UWB devices that support "ranging" as specified by ECMA International Standard ECMA-368 (ISO/IEC Specification 26907) to determine the distance between UWB devices for the purpose of determining whether a docking station is within range.

Figure 6:
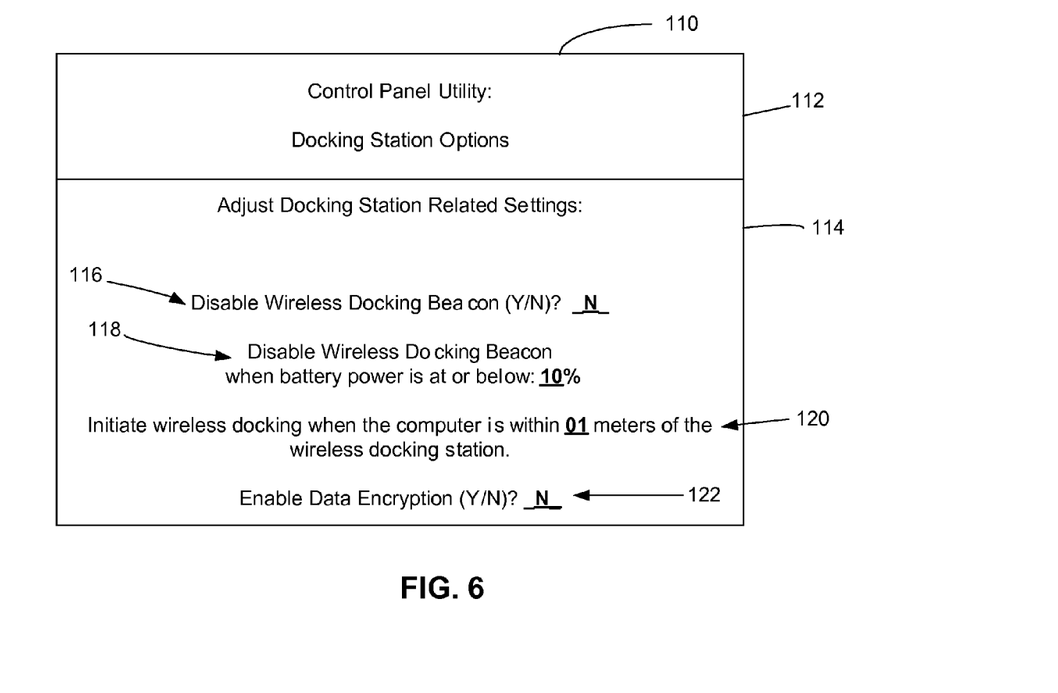
FIG. 6 is a representative view of a control panel utility.

FIG. 6 is a representative view of a control panel user interface 110 that may be utilized to adjust power and range settings for wireless docking sessions. The top portion of the window 112 denotes that it is a control panel window for adjusting docking station options. The lower portion of the control panel window 114 shows some of the particular docking station settings that may be adjusted. Here, the first line shows the ability to disable the wireless docking beacon 116 by entering a "Y" or "N." The second line shows that the wireless docking beacon may be automatically disabled to conserve power 118 when the power level of the battery of the portable computer drops below a selected level. "10%" is shown here, but this may be adjusted at the user's discretion by keying in a different number. The user may also set the distance from the wireless docking station that should be considered within range by keying in a distance on the corresponding line of the control panel window 120. The number "01" is shown here to indicate that a wireless docking session should initiate when the portable computer is placed within one meter of the docking station, but a user could enter in a larger number if the requirements of their docking session may still be fulfilled at that distance. Alternatively, this setting could be adjusted by allowing the user to select a purpose for their docking session, such as using a monitor accessing a disk drive, and the software utility may adjust the wireless docking settings accordingly. The control panel utility may also be used to activate or deactivate encryption 122 to correspond to whether the docking session is supporting a high or low security application. Similarly, the control panel utility may be used to configure a password setting or other type of authentication for the docking station to prevent unauthorized use of the docking station and any associated resources or peripheral devices. It is also noted that while user input here is in the form of keyboard input, the control panel could be altered to give the user a limited set of options that could be adjusted through checkboxes, selectable text, or other similar software controls.

It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A portable computer, comprising:
    a wired connector adapted for engagement with a wired connector of a docking station;
    a wireless transceiver operable to transmit a ping signal across a wireless medium and receive an acknowledge signal also across the wireless medium in response to the ping signal;
    a comparator coupled to the wireless transceiver for comparing a signal strength of the acknowledge signal to a predetermined value to determine whether the signal strength is adequate to support a wireless docking session before data is transmitted across the wireless medium;
    a processor having program instructions operable thereon for controlling data transmission between the portable computer and the docking station, wherein upon execution of the program instructions, the processor is configured for transmitting data from the wireless transceiver across the wireless medium in lieu of transmitting data across the wired connectors only if the signal strength of the acknowledge signal is greater than the predetermined value and the wired connector of the portable computer is disconnected from the wired connector of the docking station.

2. The portable computer as recited in claim 1, wherein the processor is further configured for transmitting data across the wired connectors if the wired connector of the portable computer is engaged with the wired connector of the docking station.

3. The portable computer as recited in claim 1, wherein the wired connector of the portable computer comprises at least one pin, which is adapted for receiving a signal from the docking station when the wired connector of the portable computer is physically connected to the wired connector of the docking station.

4. The portable computer as recited in claim 3, wherein when the at least one pin receives the signal, the processor is configured for transmitting data between the portable computer and the docking station via the wired connectors.

5. The portable computer as recited in claim 3, wherein if the at least one pin does not receive the signal, the processor is configured for detecting whether the acknowledge signal has been received by the wireless transceiver, determining whether the acknowledge signal strength is adequate to support a wireless docking session, and if so, transmitting the data from the wireless transceiver across the wireless medium to the docking station.

6. The portable computer as recited in claim 1, further comprising a control panel user interface, which enables a user of the portable computer to specify configuration settings for wireless docking sessions.

7. The portable computer as recited in claim 6, wherein said configuration settings comprise a first setting that enables a user to specify whether ping signals are periodically sent to the docking station via the wireless transceiver, or whether the ping signals are disabled.

8. The portable computer as recited in claim 7, wherein said configuration settings comprise a second setting that allows a user to specify a power level of the portable computer below which the ping signals will be automatically disabled.

9. The portable computer as recited in claim 6, wherein said configuration settings comprise a fourth setting that allows a user to specify a bandwidth required by one or more resources for wireless transmission.

10. The portable computer as recited in claim 6, wherein said configuration settings comprise a third setting that allows a user to specify a range within which the processor will attempt to initiate a wireless docking session with the docking station, wherein the range comprises a physical distance between the portable computer and the docking station.

11. A system, comprising:
a portable computer having a first wireless transceiver and a first wired connector;
a docking station having a second wireless transceiver and a second wired connector;
wherein the docking station comprises an embedded processor coupled to detect a first wired signal sent from the first wired connector and a first wireless signal sent from the first wireless transceiver; and
wherein the portable computer comprises:
a comparator coupled for receiving a second wireless signal sent from the docking station and comparing a strength of the second wireless signal to a predetermined value to determine whether the strength of the second wireless signal is adequate to support a wireless docking session before data is transmitted across a wireless medium; and
a processor having program instructions operable thereon for controlling data transmission between the portable computer and the docking station, wherein upon execution of the program instructions, the processor is configured for:
(i) transferring data across a wired medium between the portable computer and at least one peripheral device coupled to the docking station via the first and second wired connectors if the first and second wired connectors are engaged; and
(ii) transferring data across the wireless medium between the portable computer and said at least one peripheral device via the first and second wireless transceivers only if: (a) the first and second wired connectors are not engaged, and (b) the strength of the second wireless signal exceeds the predetermined value.

12. The system as recited in claim 11, wherein the docking station comprises a KVM switch.

13. The system as recited in claim 12, wherein the embedded processor of the docking station changes a setting of the KVM switch to receive data, which is transmitted across the wired medium when the first and second wired connectors are engaged, and wherein the embedded processor changes the setting of the KVM switch to receive data, which is transmitted across the wireless medium when the first and second wired connectors are not engaged.

14. The computer docking system as recited in claim 11, wherein said at least one peripheral device comprises at least one of a keyboard, a mouse and a monitor.

15. The system as recited in claim 11, wherein the docking station further comprises a switching mechanism coupled to the second wireless transceiver, the second wired connector, and the embedded processor for routing the data transmitted from the first wired connector or the first wireless transceiver to the at least one peripheral device upon the embedded processor detecting either the first wired signal or the first wireless signal, respectively.

16. A method for sending data signals across a wireless transmission medium between a portable computer and a docking station, comprising:
moving the portable computer toward the docking station;
transmitting a ping signal across the wireless transmission medium and receiving an acknowledge signal across the wireless transmission medium in response to the ping signal;
comparing a signal strength of the acknowledge signal to a predetermined value to determine whether the signal strength is adequate to support a wireless docking session before data signals are transmitted across the wireless transmission medium;
transmitting data signals across the wireless transmission medium only if the acknowledge signal exceeds the predetermined value and a wired connector on the portable computer is disengaged from a wired connector on the docking station; and
terminating the transmission of data signals across the wireless transmission medium if a signal strength of the data signals sent across the wireless transmission medium drops below the predetermined value.

17. The method as recited in claim 16, further comprising re-initiating wireless communication between the portable computer and the docking station if:
(i) the wired connector on the portable computer is disengaged from the wired connector on the docking station; and
(ii) a signal strength of a wireless signal sent across the wireless transmission medium exceeds the predetermined value.

18. The method as recited in claim 16, further comprising terminating wireless communication between the portable computer and the docking station if the wired connector on the portable computer is engaged with the wired connector on the docking station.

\* \* \* \* \*